United States Patent [19]

Bennett et al.

[11] Patent Number: 4,886,563

[45] Date of Patent: Dec. 12, 1989

[54] METHOD OF MAKING CORRUGATED PAPER BOARD

[75] Inventors: Peter G. Bennett, Kew; Peter R. McKinlay, Doncaster; Neil W. Shaw, Ivanhoe; Ronald A. Stott, Kooyong, all of Australia

[73] Assignee: Amcor Limited, South Melbourne, Australia

[21] Appl. No.: 165,764

[22] Filed: Mar. 9, 1988

Related U.S. Application Data

[63] Continuation-in-part of Ser. No. 902,160, Aug. 20, 1986, abandoned.

[30] Foreign Application Priority Data

Sep. 4, 1985 [AU] Australia .................. PH02271

[51] Int. Cl.⁴ ..................... B31F 1/24; B31F 1/28
[52] U.S. Cl. ..................... 156/205; 156/210; 156/290; 156/292
[58] Field of Search ............ 156/205, 307.3, 206, 156/324, 208, 462, 209, 465, 210, 467, 214, 472, 290, 292, 473, 474; 264/46.4, 505, 508

[56] References Cited

U.S. PATENT DOCUMENTS

| | | | |
|---|---|---|---|
| 1,802,880 | 4/1931 | Cumfer | 156/205 |
| 3,700,518 | 10/1972 | Ohmori | 156/210 |
| 3,738,905 | 6/1973 | Thomas | 156/210 |

FOREIGN PATENT DOCUMENTS 0393156 12/1908 France .

Primary Examiner—Merrell C. Cashion, Jr.
Attorney, Agent, or Firm—Bucknam and Archer

[57] ABSTRACT

A structural corrugated paper board for use in forming boxes which incorporates two fluted layers bonded peak to peak enclosed in two outer liners. By increasing board thickness and concentrating strength in the outer liners and eliminating the inner liner between the fluted layers improved edge compression and overall strength per unit weight is improved.

3 Claims, 6 Drawing Sheets

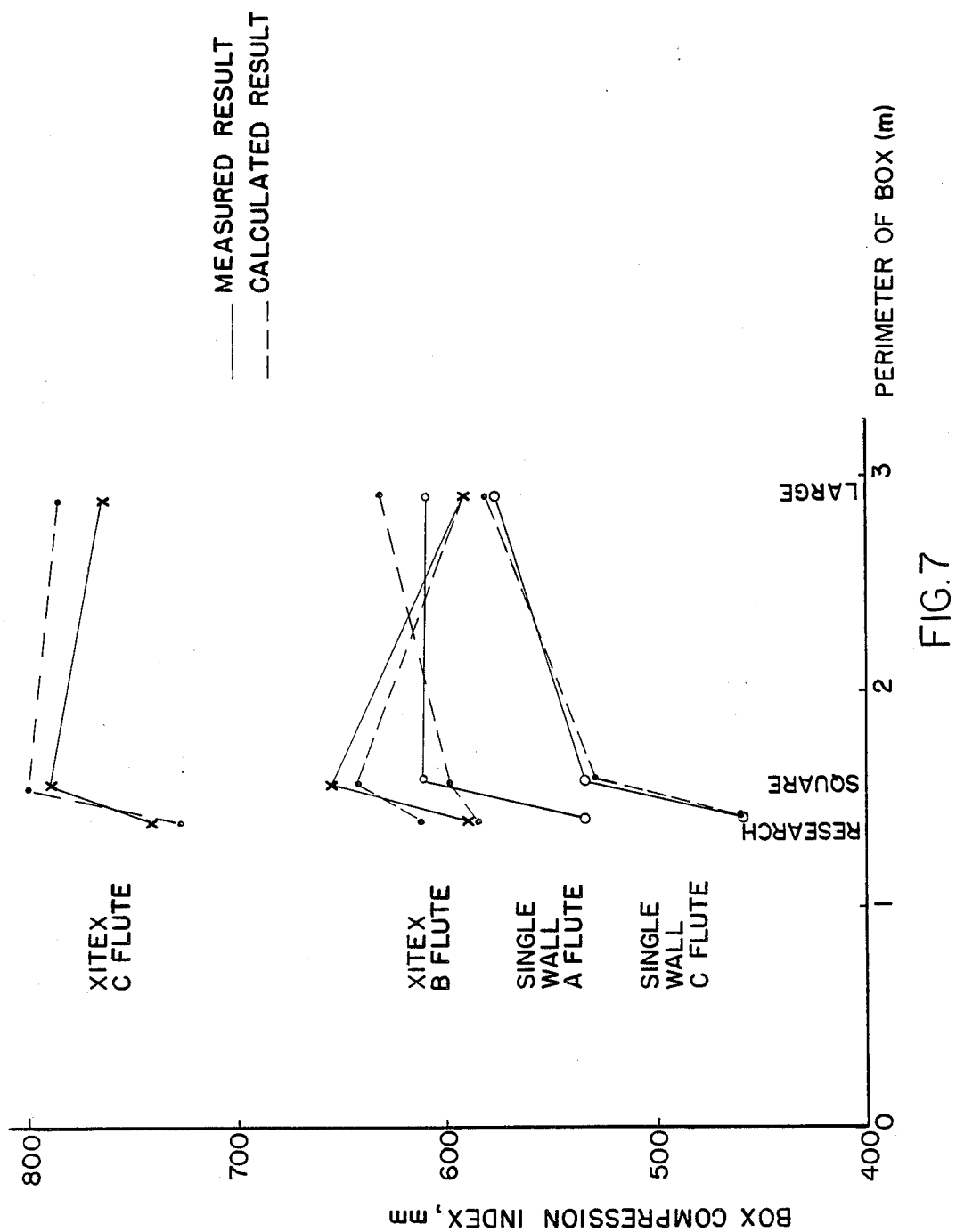

METHOD OF MAKING CORRUGATED PAPER BOARD

This application is a continuation-in-part of U.S. Ser. No. 902,160 filed Aug. 20, 1986, now abandoned.

This invention relates to an improved corrugated paper board structure which provides substantially greater top to bottom compression strength in a corrugated paper board box than conventional corrugated paper boards.

The corrugated box plays a major role in modern physical distribution systems and the top to bottom compression strength of the box under sustained loads is one of the main functional requirements.

Conventional corrugated paper board consists of alternate layers of corrugated medium (flutes) and liners. Reference is made to the following types of construction.

Single face—one layer of flutes adhered to one liner.
Single wall—one layer of flutes adhered between two liners.
Double wall—two layers of flutes adhered between three liners.

The conventional flute boards are given their usual designations and have the characteristics:

| Flute type | Flutes/meter | Flute height mm |
| --- | --- | --- |
| A | 110–120 | 4.0–4.8 |
| C | 127–140 | 2.8–3.7 |
| B | 150–167 | 1.8–2.5 |
| E | 295–327 | 1.5–1.8 |

The work of McKee [McKee, R. C., Gander, J. W. and Wachuta, J. R., "Compressive strength formula for corrugated boxes", Paper board Packaging 48 (8): 149 (1963)], using the principles of engineering mechanics, led to a simplified compression formula that has greatly influenced the last two decades' development of linerboards and corrugating mediums. This formula is based on an empirical relationship between critical buckling loads and ultimate failure loads.

U.K. patent specification No. 939106 discloses a paper board panel having two mediums bonded to outer liners a flute peaks and internally bonded together. Each internal medium comprises a sheet having spaced apart flutes which are bonded to the outer liners and the flat sections provide a long bonded interface. This structure avoids the use of conventional symmetrical fluting medium and suffers from low flat crush resistance because the flute tips bonded to the liners are spaced apart. This spacing of the flute tips also contributes to poor lateral buckling resistance by the outer liners.

French Pat. No. 393156 (1908) discloses a packaging material used for cushioning to protect fragile containers housed in larger rigid crates. The material comprises two corrugated mediums bonded together at their flute tips with one or two outer liners. Structural paperboards for use in box manufacture have never used two fluted mediums bonded directly flute peak to flute peak.

McKee et al have shown that the most important combined paper board property influencing top to bottom compression strength to be edge compression strength in the direction parallel to the flutes. The flexural stiffness properties, in both directions, were also shown to be of importance. These simple guidelines to box performance were highlighted to concentrate attention on the most important aspects of board quality in achieving maximum compression strength, and these guidelines have served the industry well.

However, it is generally recognized that actual box performance can differ significantly from that predicted by the McKee equation, particularly when changes in furnish or the balance of board properties are involved, even though the simple guidelines are maintained.

This invention is predicated on the discovery that the resistance to local buckling of the liner on the inside of the box is a better measure of the critical failure property of the board than edge compression strength. More correctly, it is the liner on the concave side of the buckled (but not yet failed) box panel. Because the contents of the box prevent inward buckling, this is normally the inside liner. It follows that thicker boards of unconventional construction could have higher compression strength to board weight ratios than would have been expected from the McKee formula.

This construction is based on the discovery that by increasing the paper board thickness and concentrating the board's strength in the outer liners gives the best improvement in the compression to weight ratio. Conventional double wall board achieves this increased thickness aim, but the centre liner contributes nothing towards bending stiffness and inside liner buckling strength. Accordingly the elimination of the centre liner further improves the compression to weight ratio.

In manufacturing the panel of this invention it is essential that the flute tips of the two fluted mediums be bonded *precisely* to each other and subsequent to bonding the bonded mediums are constrained to maintain the orientation of each medium to the other and preferably to maintain the flute pitch of each medium.

Thus the present invention provides a method of forming a corrugated structural paper board panel comprising two outer layers of flat sheet and two inner fluted layers bonded together at the flute peaks wherein two strips of paper board are separately passed over corrugating rollers to form two fluted layers; adhesive is applied to the peaks of at least one of the two fluted layers; the fluted layers are aligned and the flute peaks brought into contact to bond the two fluted layers together at the flute peaks; maintaining the bonded flutes in flute peak to flute peak orientation preferably the flute pitch of each fluted layer is maintained by constraint until a liner is bonded to at least one of the fluted mediums; and subsequently bonding two flat sheets to the fluted layers to form the two outer liners.

FIGS. 1 and 2 disclose two possible modes of construction of corrugated paper boards of this invention.

FIG. 7 is a plot of the box compression index on the ordinate against the perimeter of the box.

Figure 1:
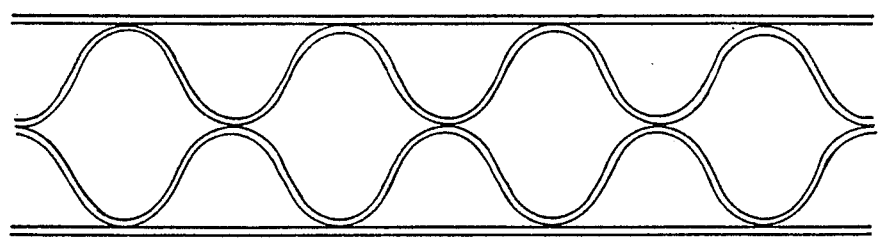
Figure 2:
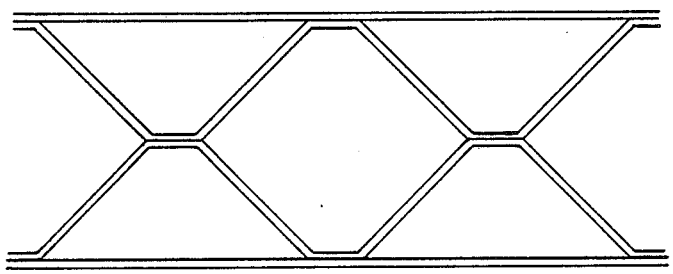

Two possible constructions according to this invention are shown in FIGS. 1 and 2 and have been called the x-flute structure.

A computer model was used to calculate the expected compression strength of a structure consisting of four panels of corrugated board joined by creases at the vertical edges. Such a structure is termed a collar and differs from a box in that the horizontal edges of the vertical panels are assumed to be hard and inflexible rather than the relatively soft creased horizontal edges of the panels of a box. The collar assumed for this exercise was 390 mm long by 390 mm wide by 290 mm high. The boards compared were conventional single wall with two 215 g/m² liners, one 117 g/m² corrugating medium and an X-flute board with two 130 g/m² liners and two 117 g/m² corrugating mediums. Total grammage of both boards was the same at 600 g/m².

Results predicted are shown in Table 1.

TABLE 1

| Structure | Compression Strength, N |
|---|---|
| Standard board | 5290 |
| X-flute | 8090 |

Based on these predicted results, which show about a 50 percent improvement in compression strength for the X-flute construction, laboratory samples of X-flute board were made up into collars for compression testing and confirmation of the predicted results.

The board components for X-flute construction were two, single faced boards using 140 g/m² liners and 117 g/m² of conventional "C" flute mediums. These were carefully glued together, flute tip to flute tip.

Two conventional commercial boards were selected with grammages close to the made up experimental X-flute structure. The first of these comprises 2×240 g/m² liners and a 117 g/m² conventional "A" flute, and the second 2×293 g/m² liners and a 117 g/m² conventional "C" flute. The X-flute and the conventional board were made into collars 400 mm long by 400 mm wide by 270 mm high.

Test results are shown in Table 2.

TABLE 2

| Test Property | Experimental Board "X" Flute | Conventional Boards "A" Flute | Conventional Boards "C" Flute |
|---|---|---|---|
| Liners, g/m² | 140 | 240 | 293 |
| Medium(s), g/m² | 2 × 117 | 117 | 117 |
| Combined board grammage, g/m² | 673 | 651 | 728 |
| Combined board thickness, μm | 7550 | 4620 | 4340 |
| Edge crush test (ECT), kN/m | 6.5 | 5.9 | 7.3 |
| Board hardness, kPa* | 91 | 47 | 113 |
| Collar Compression, N | 7870 | 4130 | 5340 |

The collar compression tests as shown in this table confirm the 50 percent improvement in top to bottom compression of the X-flute construction predicted by the model. This result would not have been predicted by the McKee formula.

In a further series of test laboratory samples of X-flute and conventional single wall and double wall boards were made in the laboratory from various component combinations. Some combinations were made into collars, some into boxes, some into both collars and boxes.

Figure 3:
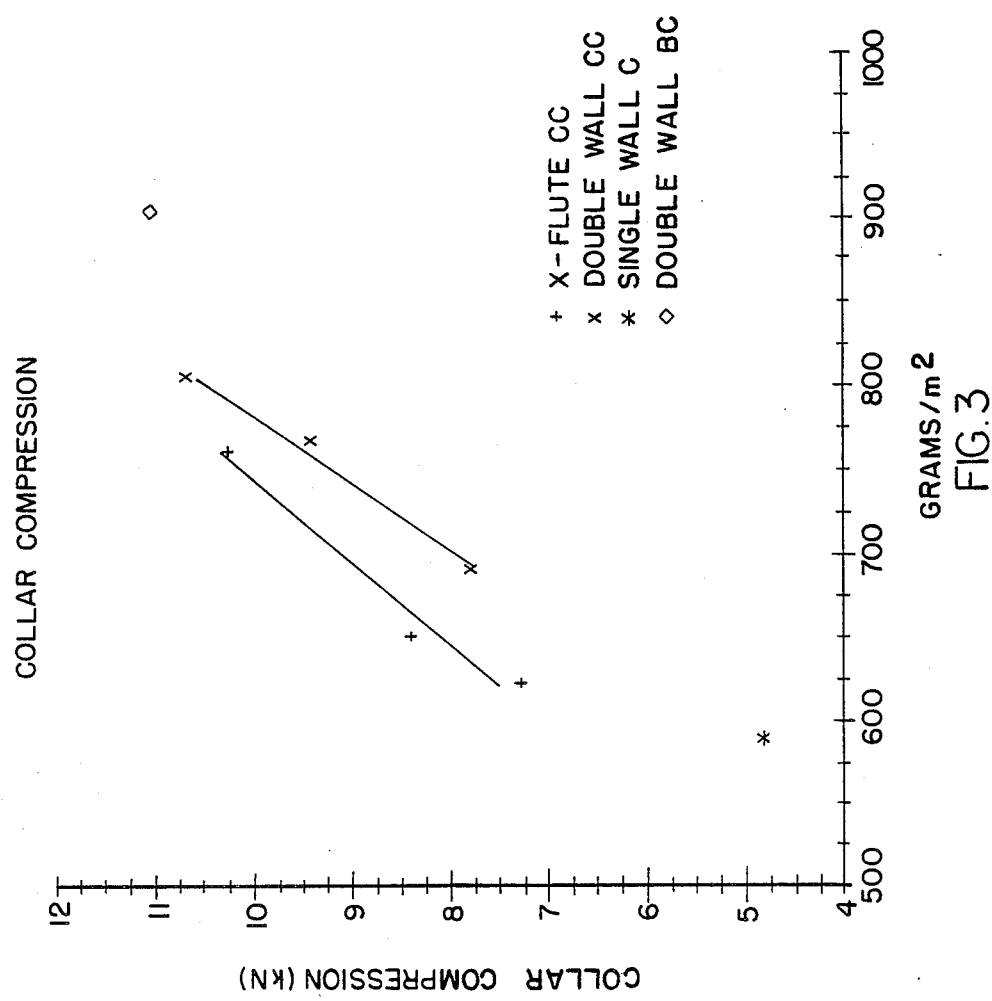
FIGS. 3, 4 and 5 illustrate test results comparing the corrugated board of this invention with the prior art.
Figure 4:
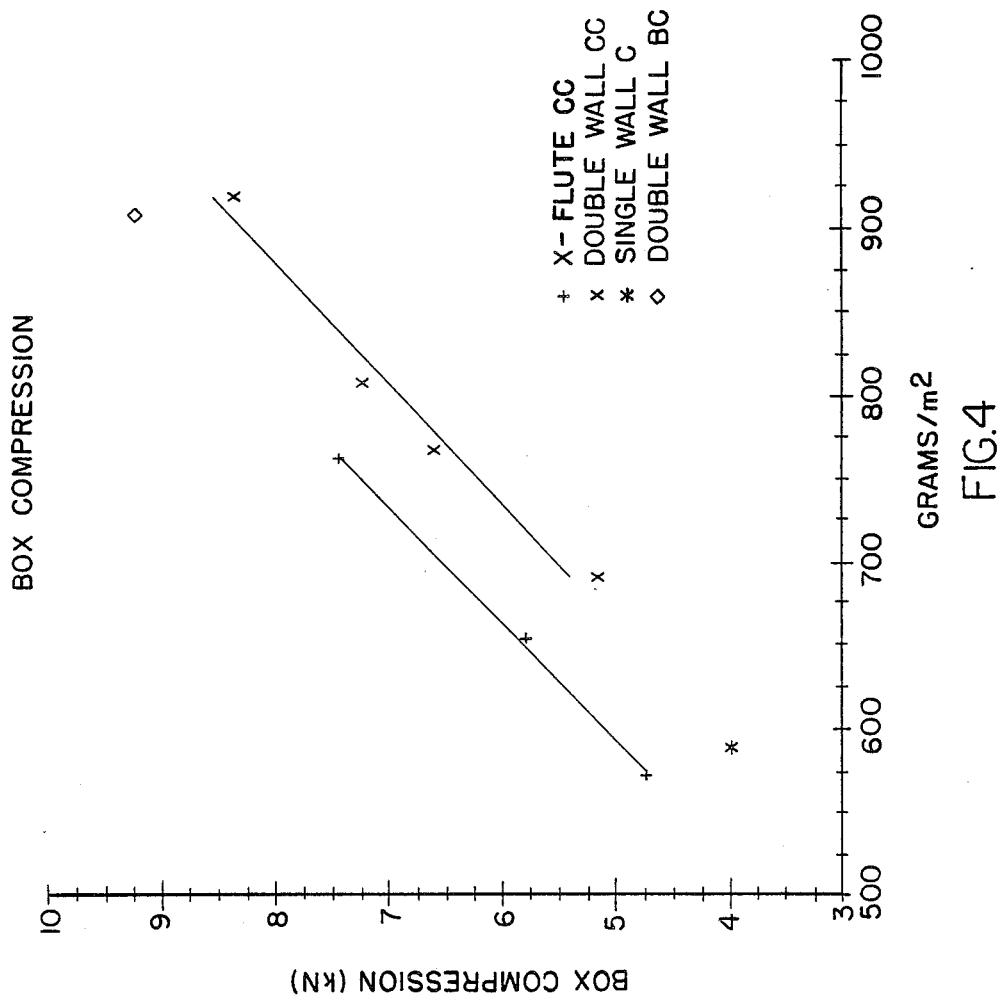
Figure 5:
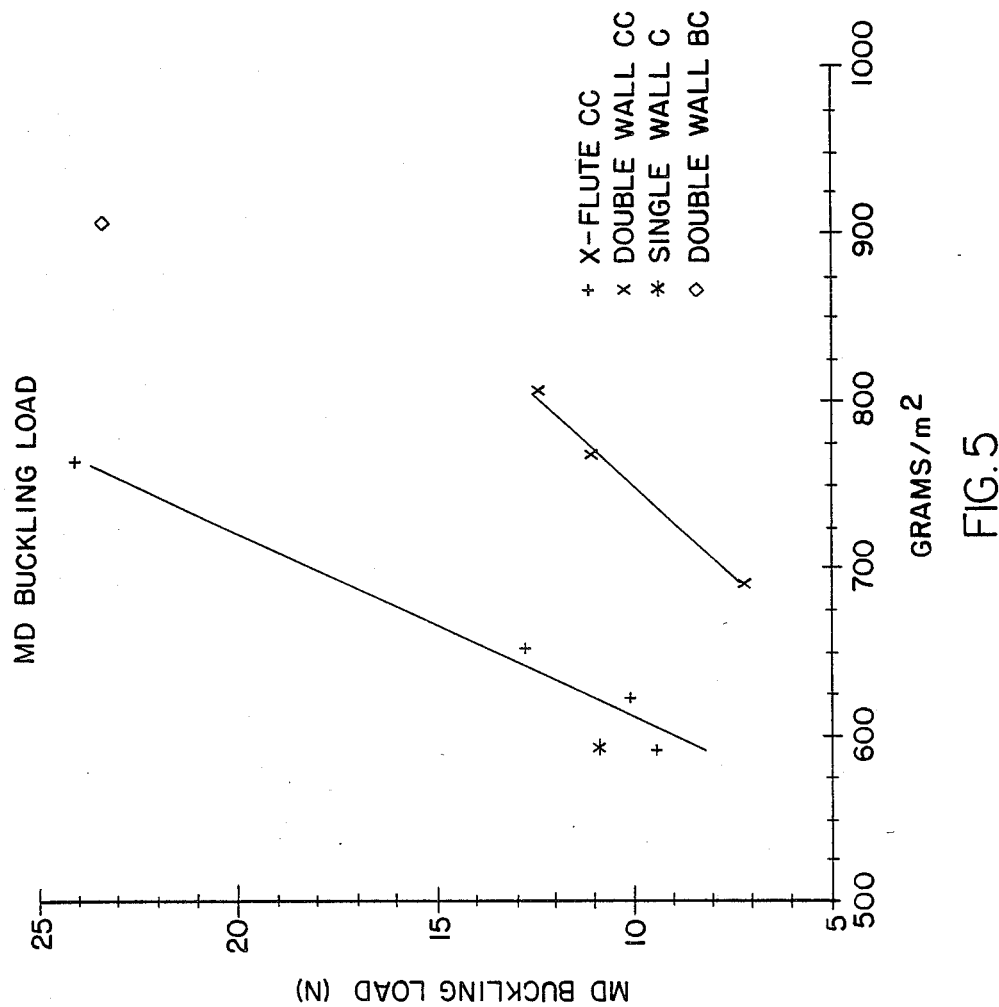

Selected test results on these materials are shown in Tables 3 and 4 and FIGS. 3, 4 and 5. The bending stiffness and buckling load measurements were made on beams 75 mm wide loaded at the centre of a 230 mm wide span.

The figures listed in brackets in Tables 3 and 4 are the percentage advantage of X-flute per unit of corrugated board weight compared with the conventional material.

TABLE 3

X-Flute versus Conventional Single Wall Corrugated Board C Flute and 117 g/m² Corrugating Medium used throughout.

| | Single Wall | X Flute 1 | X Flute 2 |
|---|---|---|---|
| Liners, g/m² | 210 | 117 | 140 |
| Total board components, g/m² | 590 | 573 | 620 |
| Collar compression strength, N | 4812 | Not avail. | 7254 (43%) |
| Box compression strength | 3999 | 4744 (22%) | Not avail. |
| Bending stiffness, Nm | | | |
| Machine direction | 9.1 | 9.7 (10%) | 12.5 (31%) |
| Cross direction | 4.6 | 7.4 (66%) | 8.6 (78%) |

TABLE 4

X-Flute versus Conventional Double Wall Corrugated Board C Flute and 117 g/m² medium throughout.

| | Double Wall | X-Flute |
|---|---|---|
| Outside liners, g/m² | 155 | 210 |
| Inside liners, g/m² | 117 | Not applic. |
| Total board components | 766 | 759 |
| Collar compression strength, N | 9392 | 10190 (10%) |
| Box Compression strength, N | 6589 | 7425 (14%) |
| Bending stiffness, Nm | | |
| Machine direction | 13.4 | 24.7 (86%) |
| Cross direction | 11.4 | 15.9 (41%) |
| Buckling load, N | | |
| Machine direction | 11.1 | 24.1 (119%) |

For these materials the advantage of X-flute over conventional single wall board in collar compression strength to board weight ratio was between 40 and 50%. The X-flute advantage over single wall in box compression, although less than in collar compression, was over 20%.

Compared with conventional double wall boards, X-flute had 10 to 15% higher collar and box compression strength to board weight ratios.

A disadvantage of conventional double wall board at low board weights is that the need to provide a centre liner means that the outside liners must be low in weight and the board is therefore susceptible to failure by buckling of these outside liners between the flute tips. The test results for MD buckling load shown in Table 4 and FIG. 5 show the large advantage of X-flute in this respect. X-flute therefore has a low combined board grammage limit before the liners become susceptible to failure by buckling between the flute tips.

Further advantages of X-flute compared to double wall board are that it requires one less component and one less glue line.

This invention is not restricted to the combining tip to tip of any of the conventional A, B, C or E flute shapes, but also covers the combining of unconventional flute structures such as flat tip flutes. FIG. 2 illustrates such a flat tip flute structure.

The main thrust of the invention is to provide a means of increasing corrugated board thickness and of concentrating strength on the outer liners without introducing structural weaknesses such as low flute crushing strength, low flute shear strength or excessive flute tip to flute tip distances.

Figure 6:
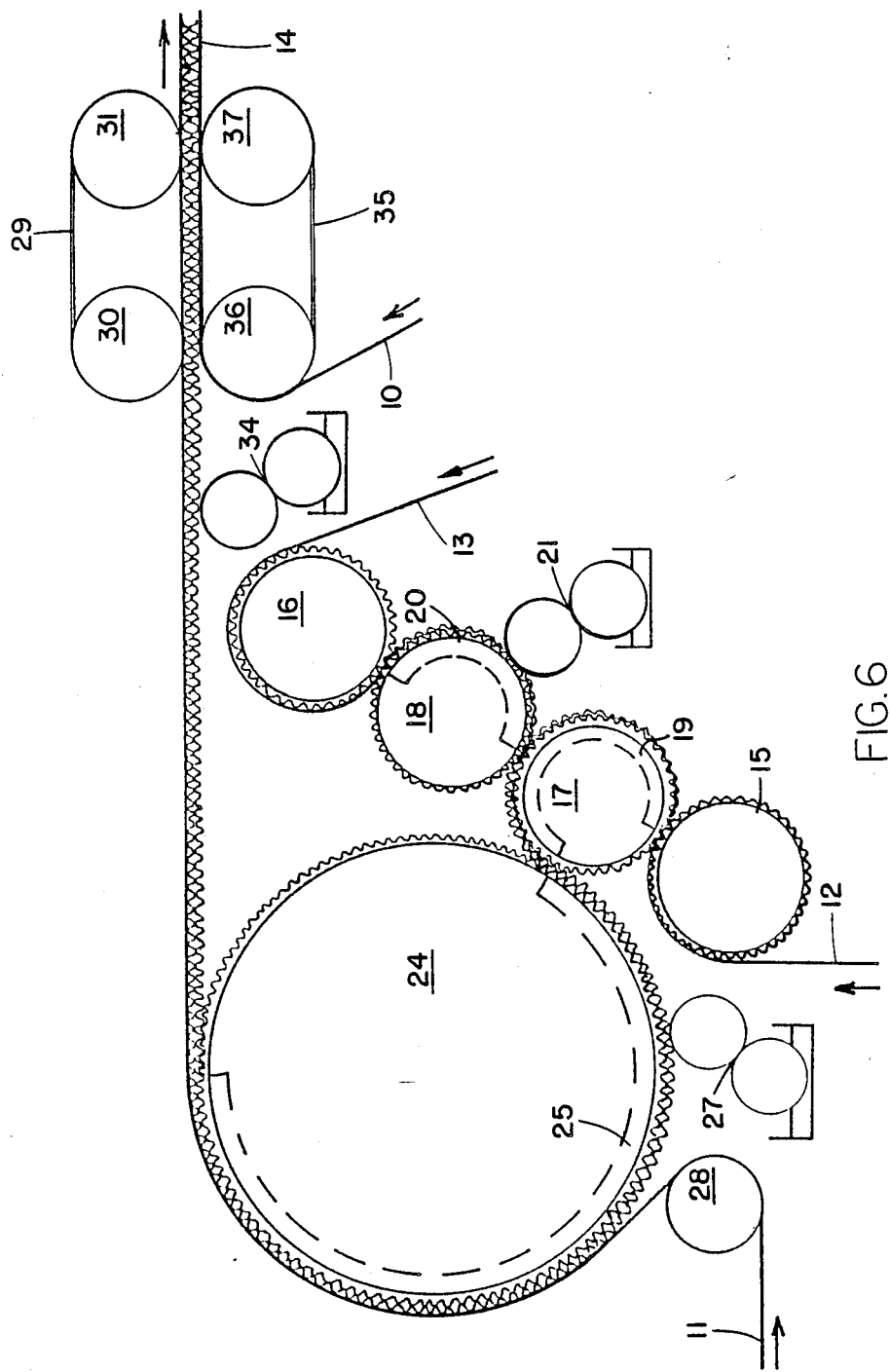
FIG. 6 illustrates a schematic arrangement for manufacturing the corrugated board of this invention.

A method of forming an X-flute construction is illustrated in FIG. 6. The two mediums are corrugated in conventional corrugating rolls and combined prior to the liner being attached.

The liner 10, the liner 11 and the centre mediums 12 and 13 are brought together to form the X-flute board 14.

The medium 12 is passed into the labyrinth corrugating rollers 15 and 17 to form the corrugated medium which is held to roller 17 by vacuum box 19.

Medium 13 similarly passes into the labyrinth between corrugating roller 16 and 18 to form the corrugating medium which is held to roller 18 by vacuum box 20 and is coated with glue by applicator station 21. The mediums 12 and 13 are bonded together at the contact point between corugating rollers 17 and 18 which are synchronized to ensure bonding at the tips of the flutes. Each of the rollers 15, 16, 17 or 18 may be heated to assist flute formation and glue bonding.

The flutes of mediums 12 and 13 are thus precisely bonded at the point of contact between rollers 17 and 18. Thus bonded mediums 12, 13 are then supported on roller 17 to maintain their flute peak to flute peak orientation and the orientation of the flutes in each layer.

The combined mediums 12 and 13 are then transferred to the synchronised corrugated roller 24 under the influence of the vacuum box 25. Glue is applied to the fluted medium by station 27.

The liner 11 is fed over roller 28 and onto the roller 24 to bond the combined mediums 12 and 13 to the line 11. Drying of the glue while the liners 11 and mediums 12 and 13 are still on roller 24 can be assisted by application of energy from an external heat or microwave source.

The liner 10 is passed onto the belt 35 which is run over rollers 36 and 37. This enables the top liner 10 to be bonded to the combined mediums 12 and 13 which have been coated with glue at applicator station 34. The thus formed corrugated board is fed between belts 29 and 35 and withdrawn. The belt 29 runs on rollers 30 and 31 and provides counter pressure to belt 35. Energy to dry the final adhesive application can be applied either at the belts 29 and 35 or subsequently.

Any or all of the components may be preheated, moistened or pretreated before entering the process to assist forming and bonding or impart special properties to the made up board.

The corrugating roll 24 may require only machined grooves rather than fully shaped corrugations. Since this roll is not required to form the corrugations, it does not have to be made from hardened or chromium plated steel as do the corrugating rollers 15, 16, 17 and 18. A non-metallic material may be suitable.

In this basic method of forming X-flute, the roll 24 in FIG. 6 may be replaced by a synchronised belt.

Another variation of this basic method would be to dispense with roll 24 in FIG. 6 and join the first liner 11 to the two bonded together mediums 12 and 13 while these are retained in corrugating roller 17.

(1) The X-flute construction achieves greater board thickness combined with greater concentration of strength in the outer liners than conventional corrugated forms.

(2) The board of this invention fulfills the other structural requirements of a fluted structure, namely adequate resistance to flute crushing, adequate shear stiffness and acceptably small flute tip to flute tip distances.

(3) The X-flute structure provides 20–50% higher box and collar compression strength to board weight ratios than comparable conventional single wall boards.

(4) The X-flute structure provides over 10% higher box and collar compression strength to board weight ratios than comparable conventional double wall boards.

(5) The X-flute board has 10–90% higher bending stiffness per unit board weight than conventional boards, depending on direction of testing and board construction.

(6) The X-flute board has up to 120% better resistance to buckling load per unit board weight than conventional double wall board.

For the purpose of comparing the performance of the corrugated structural paperboard panel according to the present invention with conventional board, the box compression index is being used. This value is believed to be preferable to box compression figures because box compression does not just depend on the weight of components but also on the intrinsic strength properties of the materials used, the size and shape of the box panels and the type of flute. The box compression index is the box compression divided by the sum of edge crush of components. It is a measure of the box strength in relation to the strength of the components used. This allows for the fact that a box with heavier component weights will give a higher box compression. After we have allowed for these factors, what is left depends only on geometry (i.e. flute size, box size, board thickness and panel shapes). It is in this geometry aspect that Xitex, the corrugated structural paperboard panel according to the present invention, shows an advantage. The results are summarized in Table 5.

TABLE 5

| | Box Compression Strength Index (mm) | | | | | |
| | Large | | Square | | Research | |
| Box Size[1] | Measured | Calculated | Measured | Calculated | Measured | Calculated[2] |
| Xitex C | 793 | 828 | 813 | 831 | 707 | 701 |
| (PMX110) | 814 | 848 | 816 | 825 | 681 | 795 |
| | 689 | 680 | 745 | 740 | 832 | 681 |
| Average | 765 | 785 | 791 | 799 | 740 | 726 |
| Range | 125 | 168 | 71 | 91 | 151 | 114 |
| Xitex B | 592 | 593 | 630 | 627 | 591 | 613 |
| (PMX111) | | | 678 | 656 | | |
| Average | 592 | 593 | 654 | 642 | 591 | 613 |
| Range | — | — | 48 | 29 | — | — |
| Single Wall C | 552 | 581 | 553 | 528 | 432 | 461 |
| (PMSW12) | 600 | 581 | 515 | 528 | 487 | 461 |
| Average | 576 | 581 | 534 | 528 | 460 | 461 |
| Range | 48 | — | 38 | — | 55 | — |
| Single Wall A | 598 | 619 | 608 | 558 | 544 | 521 |
| (PMSW13) | 615 | 643 | 649 | 595 | 526 | 553 |
| | | | 621 | 629 | | |
| | | | 558 | 613 | | |

TABLE 5-continued

| Box Size[1] | Box Compression Strength Index (mm) | | | | | |
|---|---|---|---|---|---|---|
| | Large | | Square | | Research | |
| | Measured | Calculated | Measured | Calculated | Measured | Calculated[2] |
| Average | 607 | 631 | 609 | 599 | 535 | 587 |
| Range | 17 | 24 | 91 | 71 | 18 | 32 |

Notes:

[1]Box size, mm

| | Length | Width | Depth |
|---|---|---|---|
| Research | 406 | 306 | 236 |
| Square | 400 | 400 | 270 |
| Large | 560 | 360 | 900 |

[2]Calculated figures are obtained using the Amcor Container Design model.

TABLE 6

COMPONENT DATA FOR CALCULATION OF BOARD PROPERTIES

| FLUTE | A | B | C | E |
|---|---|---|---|---|
| FLUTE CODE | 1 | 2 | 3 | 4 |
| FLUTE DEPTH, μm | 4700 | 2460 | 3610 | 1140 |
| TAKE UP RATIO | 1.54 | 1.33 | 1.45 | 1.255 |
| K FACTOR | 1.13 | 1.23 | 1.16 | 1.28 |
| DISTRIBUTION RATIO | .3624 | .3424 | .3438 | .3180 |
| FLUTES/m | 110 | 154 | 129 | 295 |

COMPONENT PROPERTIES

| CODE | 1 DUO | 2 DUO | 3 S'FLUTE | 4 LINER | 5 LINER | 6 K'FT LINER | 7 K'FT LINER |
|---|---|---|---|---|---|---|---|
| GSM | 117 | 155 | 180 | 155 | 185 | 210 | 250 |
| DELIVERED AREA COST, Cents/m**2 | | | | | | | |
| THICKNESS, μm | 214 | 264 | 311 | 259 | 287 | 327 | 398 |
| EXTENSIONAL STIFFNESS, kN/m | | | | | | | |
| MD | 987 | 1353 | 1465 | 1320 | 1856 | 1794 | 2115 |
| CD | 333 | 549 | 667 | 525 | 613 | 689 | 746 |
| RING CRUSH, N | | | | | | | |
| MD | 214 | 421 | 448 | 386 | 509 | 563 | 626 |
| CD | 158 | 314 | 463 | 300 | 329 | 402 | 433 |

The figures in Table 5 have been extracted from the box compression summaries PMPAT where the component data is given in Table 6. It should be noted that in Tables 7, 8, 9 and 10, an edge crush figure is given (8th figure down) which is calculated from the sum of the CD Ring Crush figures of the respective components, including a take up factor for the fluted mediums. The cross direction (CD) figure is used, as this represents the vertical direction of the board in the made up box.

The data of Table 5 are plotted in the graph FIG. 7 in which the box compression index is plotted against the perimeter of the box. This graph shows that (a) For square boxes, Xitex C board has a measured Box Compression Index which is a minimum of 35% and on average 48% greater than for single walled C board a minimum of 15% and an average of 30% greater than for single walled A board.

(b) The effect of box perimeter (c) A clear distinction between the various board structures with Xitex boards showing a better box performance than single wall boards for the particular component materials used.

(d) For large boxes the Xitex B does not perform as well as might be expected. As the large boxes are outside the normal commercial range they should not be given the same significance as the research and square boxes, but are included to indicate there is a complex dependency of Box Compression on panel shapes, with a square box giving the best performance.

In interpreting the graph, it should be noted that the average range in results is 70 (i.e. +35) so that distinctions which are clear on the averaged results begin to disappear when individual cases are examined.

TABLE 7

SUMMARY OF PMXI10, PMPAT1 XITEX C FLUTE

| BOARD PROPERTIES | | | | | | | | | |
|---|---|---|---|---|---|---|---|---|---|
| OUTSIDE LINER CODE | 7 | 6 | 4 | 6 | 6 | 4 | 4 | 1 | 1 |
| OUTSIDE MEDIUM CODE | 1 | 1 | 1 | 1 | 1 | 1 | 1 | 1 | 1 |
| FLUTE CODE | 3 | 3 | 3 | 3 | 3 | 3 | 3 | 3 | 3 |
| INSIDE MEDIUM CODE | 1 | 1 | 1 | 1 | 1 | 1 | 1 | 1 | 1 |
| INSIDE LINER CODE | 7 | 6 | 4 | 7 | 6 | 4 | 4 | 4 | 1 |
| BOARD GRAMMAGE, g/m**2 | 839.30 | 759.30 | 649.30 | 799.30 | 759.30 | 649.30 | 649.30 | 611.30 | 573.30 |
| BOARD THICKNESS, μm | 7968 | 8135 | 7639 | 7798 | 8135 | 7639 | 7639 | 7760 | 7704 |
| EDGE CRUSH, kN/m | 10.08 | 9.61 | 8.05 | 9.84 | 9.61 | 8.05 | 8.05 | 6.97 | 5.39 |
| EDGE CRUSH per GSM, Nm/g | 12.0 | 12.7 | 12.4 | 12.3 | 12.7 | 12.4 | 12.4 | 11.4 | 10.3 |
| PANEL DEPTH A | .360 | .360 | .360 | .270 | .270 | .270 | .236 | .236 | .236 |
| SMALL PANEL WIDTH B | .560 | .560 | .560 | .400 | .400 | .400 | .306 | .306 | .306 |
| LARGE PANEL WIDTH C | .900 | .900 | .900 | .400 | .400 | .400 | .406 | .406 | .406 |
| BOX COMPRESSION MEASURED, N | 7993 | 7816 | 5550 | 8000 | 7836 | 5997 | 5695 | 4752 | 4904 |

TABLE 7-continued

SUMMARY OF PMXI10, PMPAT1 XITEX C FLUTE

BOARD PROPERTIES

| | | | | | | | | | |
|---|---|---|---|---|---|---|---|---|---|
| BOX COMPRESSION CALCULATED, N | 8346 | 8150 | 5475 | 8175 | 7926 | 5963 | 5649 | 5547 | 4011 |
| PANEL COMPR. INDEX, | | | | | | | | | |
| Small Panel | 203 | 205 | 178 | 203 | 204 | 186 | 160 | 156 | 188 |
| Large Panel | 193 | 201 | 166 | 203 | 204 | 186 | 193 | 185 | 228 |
| BOX COMPRESSION INDEX, mm | 793 | 814 | 689 | 813 | 816 | 745 | 707 | 681 | 832 |
| BOX COMPRESSION(calc)INDEX, mm | 828 | 848 | 680 | 831 | 825 | 740 | 701 | 795 | 681 |

TABLE 8

SUMMARY OF PMSW13, File PMPAT3 SINGLE WALL A FLUTE

BOARD PROPERTIES

| | | | | | | | | |
|---|---|---|---|---|---|---|---|---|
| OUTSIDE LINER CODE | 7 | 6 | 7 | 7 | 7 | 6 | 6 | 6 |
| MEDIUM CODE | 3 | 2 | 3 | 2 | 1 | 1 | 2 | 1 |
| FLUTE CODE | 1 | 1 | 1 | 1 | 1 | 1 | 1 | 1 |
| INSIDE LINER CODE | 7 | 6 | 7 | 7 | 7 | 6 | 6 | 6 |
| BOARD GRAMMAGE, g/m**2 | 777 | 659 | 777 | 739 | 680 | 600 | 659 | 600 |
| BOARD THICKNESS, $\mu$m | 5226 | 5056 | 5226 | 5184 | 5139 | 5011 | 5056 | 5011 |
| EDGE CRUSH, kN/m | 11.71 | 9.55 | 11.71 | 10.01 | 8.23 | 7.77 | 9.55 | 7.77 |
| EDGE CRUSH per GSM, Nm/s | 15.1 | 14.5 | 15.1 | 13.5 | 12.1 | 12.9 | 14.5 | 12.9 |
| PANEL DEPTH A | .360 | .360 | .270 | .270 | .270 | .270 | .236 | .236 |
| SMALL PANEL WIDTH B | .560 | .560 | .400 | .400 | .400 | .400 | .306 | .306 |
| LARGE PANEL WIDTH C | .900 | .900 | .400 | .400 | .400 | .400 | .406 | .406 |
| BOX COMPRESSION MEASURED, N | 7003 | 5873 | 7123 | 6190 | 5105 | 4332 | 5192 | 4088 |
| BOX COMPRESSION CALCULATED, N | 7248 | 6135 | 6528 | 5952 | 5176 | 4763 | 4974 | 4298 |
| PANEL COMPR. INDEX, | | | | | | | | |
| Small Panel | 156 | 160 | 152 | 162 | 155 | 139 | 131 | 127 |
| Large Panel | 143 | 148 | 152 | 162 | 155 | 139 | 141 | 137 |
| BOX COMPRESSION INDEX, mm | 598 | 615 | 608 | 649 | 621 | 558 | 544 | 526 |
| BOX COMPRESSION(calc)INDEX, mm | 619 | 643 | 558 | 595 | 629 | 613 | 521 | 553 |

TABLE 9

SUMMARY OF PMSW12, PMPAT4 SINGLE WALL C FLUTE.

BOARD PROPERTIES

| | | | | | | |
|---|---|---|---|---|---|---|
| OUTSIDE LINER CODE | 7 | 7 | 7 | 7 | 6 | 6 |
| MEDIUM CODE | 1 | 1 | 1 | 1 | 1 | 1 |
| FLUTE CODE | 3 | 3 | 3 | 3 | 3 | 3 |
| INSIDE LINER CODE | 7 | 7 | 7 | 7 | 6 | 6 |
| BOARD GRAMMAGE, g/m**2 | 670 | 670 | 670 | 670 | 590 | 590 |
| BOARD THICKNESS, $\mu$m | 4066 | 4066 | 4066 | 4066 | 3941 | 3941 |
| EDGE CRUSH, kN/m | 8.34 | 8.34 | 8.34 | 8.34 | 7.86 | 7.86 |
| EDGE CRUSH per GSM, Nm/s | 12.4 | 12.4 | 12.4 | 12.4 | 13.3 | 13.3 |
| PANEL DEPTH A | .360 | .360 | .270 | .270 | .236 | .236 |
| SMALL PANEL WIDTH B | .560 | .560 | .400 | .400 | .306 | .306 |
| LARGE PANEL WIDTH C | .900 | .900 | .400 | .400 | .406 | .406 |
| BOX COMPRESSION MEASURED, N | 4603 | 5000 | 4610 | 4290 | 3397 | 3831 |
| BOX COMPRESSION CALCULATED, N | 4847 | 4847 | 4400 | 4400 | 3624 | 3624 |
| PANEL COMPR. INDEX, | | | | | | |
| Small Panel | 148 | 160 | 138 | 129 | 106 | 119 |
| Large Panel | 129 | 140 | 138 | 129 | 110 | 124 |
| BOX COMPRESSION INDEX, mm | 552 | 600 | 553 | 515 | 432 | 487 |
| BOX COMPRESSION(calc)INDEX, mm | 581 | 581 | 528 | 528 | 461 | 461 |

TABLE 10

SUMMARY OF PMXI11, FILE PMPAT2 XITEX B FLUTE

BOARD PROPERTIES

| | | | | |
|---|---|---|---|---|
| OUTSIDE MEDIUM CODE | 6 | 6 | 4 | 4 |
| FLUTE CODE | 2 | 2 | 1 | 1 |
| INSIDE MEDIUM CODE | 2 | 2 | 2 | 2 |
| INSIDE LINER CODE | 2 | 2 | 1 | 1 |
| INSIDE LINER CODE | 6 | 6 | 4 | 4 |
| BOARD GRAMMAGE, g/m**2 | 832.30 | 832.30 | 621.22 | 621.22 |
| BOARD THICKNESS, $\mu$m | 5703 | 5703 | 5491 | 5491 |
| EDGE CRUSH, kN/m | 13.23 | 13.23 | 8.23 | 8.23 |
| EDGE CRUSH per GSM, Nm/s | 15.9 | 15.9 | 13.3 | 13.3 |
| PANEL DEPTH A | .360 | .270 | .270 | .236 |
| SMALL PANEL WIDTH B | .560 | .400 | .400 | .306 |
| LARGE PANEL WIDTH C | .900 | .400 | .400 | .406 |
| BOX COMPRESSION MEASURED, N | 7836 | 8329 | 5583 | 4863 |
| BOX COMPRESSION CALCULATED, N | 7847 | 8295 | 5403 | 5046 |
| PANEL COMPR. INDEX, | | | | |
| Small Panel | 159 | 157 | 169 | 141 |

TABLE 10-continued

| SUMMARY OF PMXI11, FILE PMPAT2 XITEX B FLUTE BOARD PROPERTIES | | | | |
| --- | --- | --- | --- | --- |
| Large Panel | 137 | 157 | 169 | 154 |
| BOX COMPRESSION INDEX, mm | 592 | 630 | 678 | 591 |
| BOX COMPRESSION(calc)INDEX, mm | 593 | 627 | 656 | 613 |

We claim:

1. A method of forming a corrugated structural paperboard panel comprising two outer layers of flat sheet and two inner fluted layers bonded together at the flute peaks which consists of:
   (a) separately passing two strips of paperboard mediums over corrugating rollers to form two fluted layers having flute peaks;
   (b) applying adhesive to said peaks of at least one of the two fluted layers;
   (c) aligning fluted layers and bringing the flute peaks into flute tip to flute tip contact to adhere the two fluted layers together;
   (d) maintaining the pitch of the adhered flutes and maintaining the flute tips to flute tips in contact until the adhesive has cured;
   (e) and subsequently bonding two flat sheets to the fluted layers to form the two outer liners.

2. A method as claimed in claim 1 wherein the adhered fluted layers are constrained in step (d) to maintain the pitch of the adhered flutes by first supporting the adhered fluted layers on a fluted carrier roll and subsequently bonding a liner to one of the fluted layers.

3. A method as claimed in claim 1 wherein the corrugating rollers used to corrugate each fluted layer in step (a) are synchronized adjacent each other to bring the layers into flute tip to flute tip contact.

* * * * *